US006260568B1

(12) United States Patent
Hsu et al.

(10) Patent No.: US 6,260,568 B1
(45) Date of Patent: Jul. 17, 2001

(54) APPARATUS AND METHOD FOR SUPPLYING UNINTERRUPTED GAS

(75) Inventors: Ming-Tzung Hsu, Hsinchu; Biing-Huang Yang; Long-Chun Tsai, both of Hsin-chu, all of (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/413,656

(22) Filed: Oct. 6, 1999

(51) Int. Cl.[7] .................................................. F16K 11/02

(52) U.S. Cl. ...................... 137/12; 137/113; 137/599.03; 137/599.09

(58) Field of Search .............................. 137/113, 599.03, 137/599.09, 100, 12

(56) References Cited

U.S. PATENT DOCUMENTS 3,643,677 * 2/1972 Begleiter .............................. 137/113
4,549,563 * 10/1985 Monnier .............................. 137/100

* cited by examiner

*Primary Examiner*—Stephen M. Hepperle
(74) *Attorney, Agent, or Firm*—Tung & Associates

(57) ABSTRACT

An apparatus and a method for supplying uninterrupted gas by using an automatic switching gas supply system are provided. In the apparatus, a main gas supply source and at least one back-up gas supply source are provided which are connected by a plurality of conduits to a process tool. The conduits further include pressure regulators such that a gas pressure from the main gas supply source is always regulated at about 0.5 $Kg/cm^2$~1 $Kg/cm^2$ higher than a gas pressure from the back-up gas supply source. The apparatus operates by pneumatic means so that no electric power is required. The apparatus further operates automatically by switching from the main gas supply source to the back-up gas supply source when the pressure drop in the main gas supply source exceeds the pressure differential that is preset in the system, e.g., between about 0.5 $Kg/cm^2$ and about 1 $Kg/cm^2$. Any other suitable range of pressure differential may also be used depending on the type of gases transported and the conduits used.

18 Claims, 3 Drawing Sheets

APPARATUS AND METHOD FOR SUPPLYING UNINTERRUPTED GAS

FIELD OF THE INVENTION

The present invention generally relates to an apparatus and a method for supplying a process gas to a semiconductor process equipment and more particularly, relates to an apparatus and a method for supplying uninterrupted process gas to a semiconductor process by using an automatic switching gas supply system to automatically switching a gas supply from a main gas supply source to at least one auxiliary gas supply source.

BACKGROUND OF THE INVENTION

In the semiconductor process industry, a large variety of different ultrapure gases are used in the fabrication plants. These gases include bulk gases such as $N_2$, $O_2$, $H_2$ and Ar which are normally used in very large quantities, and specialty gases such as He, $A_sH_3$, $PH_3$, $SiH_4$, $NH_3$ and $NF_3$ which are used only in small quantities. In general, the bulk gases are used for purging of chambers, oxidation and cleaning of wafers, while the specialty gases are used as reactant or etching gases.

The bulk gases are normally stored in large storage facilities, for instance, $N_2$ can be supplied from a liquified-nitrogen storage tank located in the gas yard or delivered from a pipeline from a remote air-separation plant; $O_2$ and Ar can be supplied from liquified gas storage tanks; while $H_2$ can be delivered from either a liquified-gas storage tank or a bank of high-pressure gas cylinders. The bulk gases are normally passed through purifiers and gas filters for removing impurities and contaminating particles before allowed to enter a gas-distribution piping system installed inside a cleanroom. On the other hand, the speciality gases are normally stored in small quantities in gas cylinders and are sent directly to the process tools from cylinders stored inside gas cabinets in the cleanroom. The gas cabinets are exhausted safety enclosures that contain the gas cylinders and the necessary gas handling equipment. The gas cabinets serves a major function of allowing purging and safe exchange of the speciality gas cylinders. The gas handling equipment, which includes gas panels incorporating all components for the control and monitoring of high purity gases. In most semiconductor fabrication facilities, the gas cabinet contains at least two process cylinders to allow easy switch-over when one cylinder is empty. In addition, another cylinder of inert gas such as nitrogen is provided for purging the piping line.

In most fabrication processes, the supply pressure for the bulk and the speciality gases is kept at under 10 $Kg/cm^2$. A few exceptions exist such as chlorine and dichlorosilane. At each point of use, the pressure of the bulk or speciality gas has to be independently and locally controlled by a series of flow control valves, pressure regulators, pressure sensors and particle filters located inside a gas manifold box. The precise pressure required for each bulk or speciality gases to be delivered to a specific process tool is determined by the process requirement. In most semiconductor cleanroom facility, one or more gas manifold boxes are installed nearby to each process tool to facilitate gas distribution and control.

A typical bulk gas distribution system 10 is shown in FIG. 1. The gas distribution system 10 is used, for instance, to distribute an inert gas such as helium. The system 10 consists essentially of two gas supply sources, i.e., a main gas supply source 12 which is a trailer mounted gas source and a back-up gas supply source 14 which is a plurality of gas cylinders with their outlets 16 parallelly connected. The gas from the main gas supply source 12 is fed to a three-way flow control valve 18 through conduit 22. The conduit 22 further includes flow control valves, pressure regulators, pressure sensors and particle filters which are not shown for simplicity reasons. The back-up gas supply source 14 is also connected to the three-way flow control valve 18 through conduit 24 for feeding a gas to the process tool 20 through the three-way flow control valve 18 when the valve is manually switched over upon an indication that the pressure of the main gas supply source 12 has dropped to a level that requires replacement. The conduit 24 further includes flow control valves, pressure sensors, pressure regulators and particle filters which are not shown.

In the conventional gas supply system 10 shown in FIG. 1, the system functions properly as long as it is tended by a system operator to effectuate the manual switching of the three-way control valve 18 when necessary. The effective operation of the gas supply system 10 is entirely dependent on the attentiveness of the system operator and thus, even when elaborate warning devices are installed on the system control panel, it is possible that human error can lead to severe consequences when a gas is fed to the process tool 30 at insufficient pressure or no gas is fed to the process tool 30. As a result, a significant loss in the fabrication yield occurs.

It is therefore an object of the present invention to provide an apparatus for supplying an uninterrupted gas to a process tool that does not have the drawbacks or shortcomings of the conventional apparatus.

It is another object of the present invention to provide an apparatus for the automatic switching of a gas supply that can not be affected by human errors made by a system operator.

It is a further object of the present invention to provide an apparatus of an automatic switching gas supply system that includes a main gas supply source and at least one auxiliary gas supply source.

It is another further object of the present invention to provide an apparatus of an automatic switching gas supply system wherein the automatic switching function is accomplished by pneumatic power and functions without electric power supply.

It is still another object of the present invention to provide an apparatus of an automatic switching gas supply system consisting of a main gas supply source and a back-up gas supply source with a pressure differential of at least 0.5 $Kg/cm^2$ between the two gas supply sources.

It is yet another object of the present invention to provide an apparatus of an automatic switching gas supply system in which a gas supply conduit switches automatically to a back-up gas supply source when the pressure of the main gas supply source drops below the pressure of the back-up gas supply source.

It is still another further object of the present invention to provide a method for automatic switching to a back-up gas supply in a gas supply system by providing a main gas supply source and at least one back-up gas supply source wherein a gas flow is controlled by a pressure differential between the two sources and by a three-way flow control valve.

It is yet another further object of the present invention to provide a method for automatic switching to a back-up gas supply in a gas supply system by flowing a gas through a conduit from the back-up gas supply source into a process tool when a pressure in the main gas supply source drops by at least 1 $Kg/cm^2$ lower than the pressure in the back-up gas supply source.

SUMMARY OF THE INVENTION

In accordance with the present invention, an apparatus and a method for supplying an uninterrupted gas by an automatic switching gas supply system are provided.

In a preferred embodiment, an automatic switching gas supply system is provided which includes a main gas supply source, at least one auxiliary gas supply source, a main gas supply conduit connecting in fluid communication at a first end with the main gas supply source and at a second end with a process machine, the main gas supply conduit further includes a first pressure regulator connected in line for allowing a gas having a first pressure to pass, and at least one auxiliary gas supply conduit in fluid communication at a first end with the at least one auxiliary gas supply source and at a second end with the process machine and the main gas supply conduit in a parallel manner, the at least one auxiliary gas supply conduit includes at least one second pressure regulator connected in line for allowing a gas having a second pressure to pass, the second pressure has a pressure differential of at least 0.5 $Kg/cm^2$ smaller than the first pressure such that only when the first pressure decreases by at least the pressure differential, the gas supply system switches automatically to the at least one auxiliary gas supply source so that gas being supplied through the at least one auxiliary gas supply conduit into the process chamber.

In the automatic switching gas supply system, the second pressure preferably has a pressure differential of at least 1 $Kg/cm^2$ smaller than the first pressure. The system operates in a mechanical manner without the need for electricity. The system may further include a three-way flow control valve connected to the process machine, the main gas supply conduit and the at least one auxiliary gas supply conduit. The main gas supply conduit may further include a first main gas supply conduit connecting the main gas supply source to the process machine through a three-way flow control valve, and a second main gas supply conduit connecting the main gas supply source to the process machine through a pressure regulating valve. The at least one auxiliary gas supply conduit may further include a first auxiliary gas supply conduit connecting the auxiliary gas supply source to the process machine through a three-way flow control valve, and a second auxiliary gas supply conduit connecting the auxiliary gas supply source to the process machine through a pressure regulating valve. The gas flown through the gas supply system may be an inert gas, or may be helium. The main gas supply source may be a trailer mounted gas supply, which may be stored at a pressure between about 40 $Kg/cm^2$ and about 160 $Kg/cm^2$. The at least one auxiliary gas supply source may include at least one back-up gas cylinder. The first pressure of the gas may be about 6.8 $Kg/cm^2$ and the second pressure of the gas may be about 5.8 $Kg/cm^2$. The pressure differential may be about 1 $Kg/cm^2$.

The present invention is further directed to a method for automatic switching to a back-up gas supply in a gas supply system which can be carried out by the operating steps of providing a main gas supply source and at least one back-up gas supply source, connecting a first conduit to the main gas supply source at a first end and to a process machine at a second end with a first pressure regulator thereinbetween for allowing a gas to flow through at a first pressure, connecting at least one second conduit to the at least one back-up gas supply source at a first end and to the process machine and the first conduit simultaneously in parallel at a second end with a second pressure regulator connected between the first end and the second end for allowing a gas to flow through at a second pressure, flowing the gas through the first conduit from the main gas supply source into the process machine when the first pressure has a pressure differential of at least 0.05 $Kg/cm^2$ larger than the second pressure, and flowing the gas through the at least one second conduit from the at least one back-up gas supply source into the process machine when the first pressure decreases by at least an amount equal to the pressure differential.

The method for automatic switching to a back-up gas supply in a gas supply system may further include the step of flowing the gas through the first conduit from the main gas supply source into the process machine when the first pressure has preferably a pressure differential of at least 1 $Kg/cm^2$ larger than the second pressure. The method may further include the step of providing the main gas supply source in a trailer mounted gas supply. The method may further include the step of providing the at least one back-up gas supply in at least one back-up gas cylinder. The method may further include the step of flowing the gas at a first pressure of 6.8 $Kg/cm^2$ and at a second pressure of 5.8 $Kg/cm^2$. The method may further include the step of connecting a three-way flow control valve to the process machine, the first conduit and the at least one second conduit, or the step of flowing through the gas supply system a gas of helium.

BRIEF DESCRIPTION OF THE DRAWINGS

These and other objects, features and advantages of the present invention will become apparent from the following detailed description and the appended drawings in which.

DETAILED DESCRIPTION OF THE PREFERRED AND ALTERNATE EMBODIMENTS

The present invention discloses an apparatus and a method for supplying uninterrupted gas to a semiconductor process tool by using an automatic switching gas supply system.

In the apparatus, the automatic switching gas supply system includes a main gas supply source and between one and three auxiliary gas supply source which are connected in fluid communication by a main gas supply conduit and at least one auxiliary gas supply conduit. The gas supply conduits are connected such that when the pressure in the main gas supply source drops to a predetermined value, the gas in the auxiliary gas supply conduit flows automatically into the process tool that is connected to the conduit. In one implementation sample, the main gas supply conduit feeds a gas to the process tool at a gas pressure of 6.8 $Kg/cm^2$, when the gas pressure drops below 5.8 $Kg/cm^2$, the gas in the at least one auxiliary gas supply source takes over and flows into the process tool. The present invention novel apparatus is a simple design that requires only pneumatic power to operate, i.e., without the need for electric power.

The present invention further discloses a method for automatic switching to a back-up gas supply in a gas supply system from a main gas supply which can be carried out by first suitably selecting a main gas supply pressure and a back-up gas supply pressure which have a pressure differential of about 0.5~1 Kg/cm$^2$. By "about", it is meant a value in the range of ±10% from the value specified. After gas from the main gas supply source is flown into a process tool for performing a process, the pressure in the main gas supply source gradually decreases until the decreased amount exceeds the pressure differential such that gas is flown from the back-up gas supply source into the process tool. The present invention novel method enables a back-up gas supply source to be activated automatically by the pneumatic pressure difference in the gas conduit without the need of manual operation by a system operator. The present invention novel method therefore completely eliminates problems caused by human errors of not detecting a pressure drop in the main gas supply source and failing to manually switching to the back-up gas supply source. Significant yield loss due to such human errors can therefore be prevented.

Figure 1:
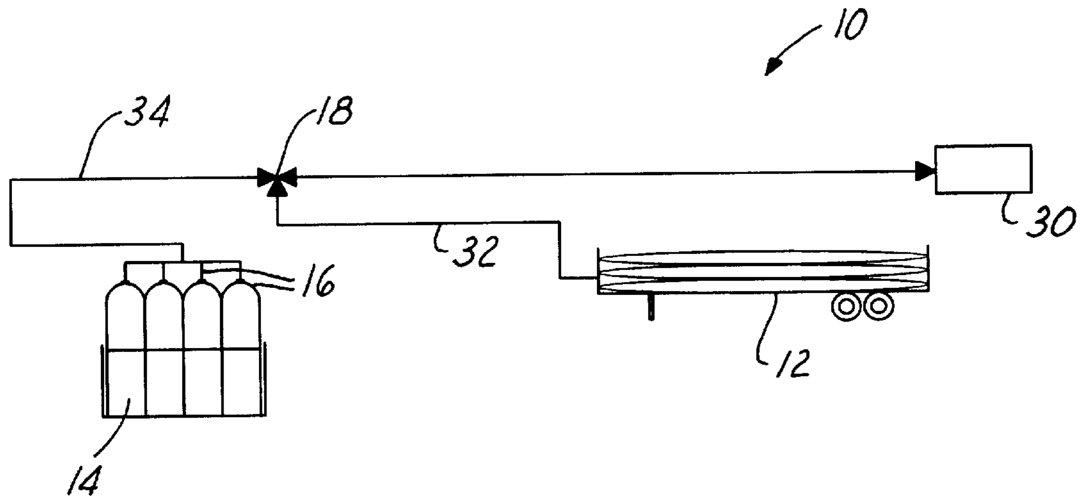
(Prior Art) FIG. 1
FIG. 1 is a schematic showing a conventional gas supply system that requires manual switching between a trailer gas source and back-up gas cylinders.
Figure 2:
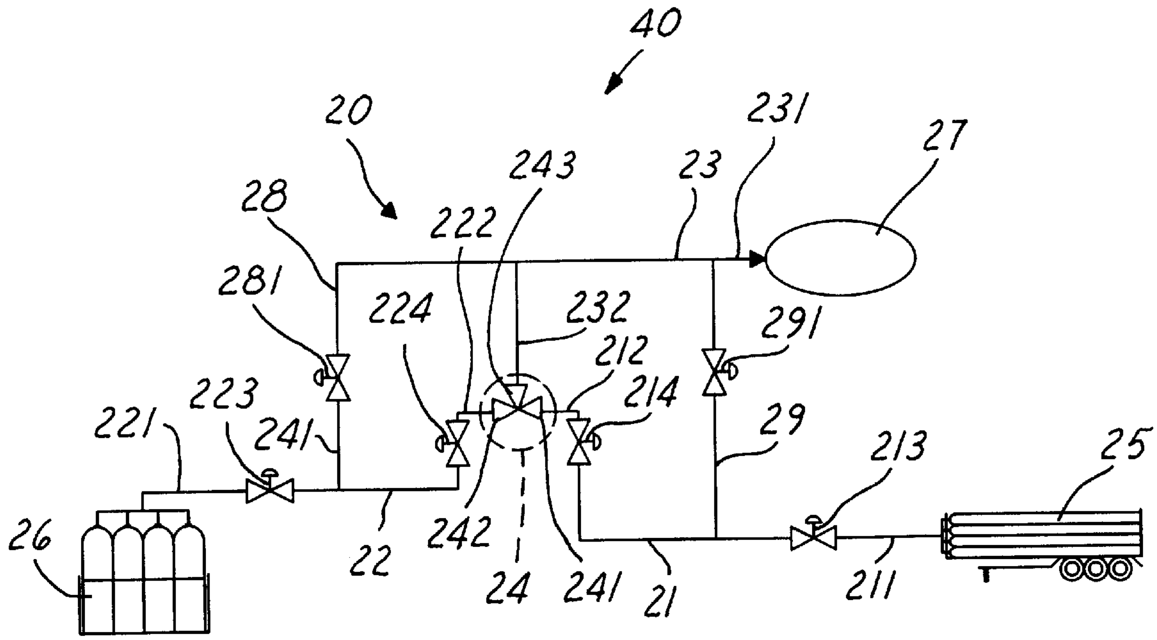
FIG. 2 is a schematic illustrating the present invention automatic switching gas supply system.

A preferred embodiment of the present invention automatic switching gas supply system 40 is shown in FIG. 2. The system 40 consists of a trailer mounted main gas supply source 25 in the form of gas tubes and a back-up gas supply source 26 in the form of gas cylinders. Conduits 211, 21, 212, 232, 23 and 231 connects the main gas supply source 25 through a pressure regulator 214 and a three-way flow control valve 24 to the process tool 27. Similarly, conduits 221, 22, 222, 232, 23 and 231 connects the back-up gas supply source 26 to the process tool 27. The present invention novel automatic switching system operates by the secondary conduits connecting the trailer gas supply 25 and the cylinder gas supply 26 to the process tool 27, respectively. For instance, the secondary conduits 211, 29 and 231 connects the main gas supply source 25 through the pressure regulator 291 to the process tool 27. The secondary conduits 221, 28, 23 and 231 connects the back-up gas source 26 to the process tool 27 through pressure regulators 223 and 281.

In a preferred embodiment for the supply of a helium gas, the operation of the present invention novel automatic switching gas supply system 40 can be described according to FIG. 2. When the trailer gas supply source 25 is used as the main gas supply source, the pressure of the helium gas when the gas tubes are freshly supplied is about 150 Kg/cm$^2$. The high gas pressure is regulated by the pressure regulator 213 to drop to about 15 Kg/cm$^2$ when gas is transported through conduit 211. Conduit 21 then transports the gas at a pressure of 15 Kg/cm$^2$ through the pressure regulating valve 214 into valve 241 of the three-way flow control valve 24. The three-way flow control valve 24 is set with an open channel between valves 241 and 243 such that the main gas supply at a further reduced pressure of about 6.8 Kg/cm$^2$ after the pressure regulator 214 can be delivered to process tool 27 through conduits 232, 23 and 231. The present invention novel method therefore utilizes a two-stage pressure regulating method in that, as shown in FIG. 2, the main gas pressure of 150 Kg/cm$^2$ in conduit 211 is first reduced to 15 Kg/cm$^2$ in conduit 21 by the pressure regulating valve 213. The main gas pressure of 15 Kg/cm$^2$ in conduit 21 is further reduced, i.e., in a second stage pressure regulation, to 6.8 Kg/cm$^2$ by pressure regulating valve 214 when flown into conduit 212. The gas pressure, under a normal delivery condition, is 6.8 Kg/cm$^2$ in conduit 212, 232, 23 and 231. To enable the present invention novel method to function properly, as shown in FIG. 2, the gas pressure in conduit 28 is also maintained at 6.8 Kg/cm$^2$ up to pressure regulating valve 281.

On the side of the auxiliary gas supply source 26, the gas is stored at 150 Kg/cm$^2$ and flown into conduit 221. The gas regulating valve 223 reduces the gas pressure in conduit 221 to 15 Kg/cm$^2$ when gas is flown into conduit 241. The gas pressure of 15 Kg/cm$^2$ in conduit 241 is then further reduced, in a two-stage pressure regulation, by the pressure regulating valve 281 to 5.8 Kg/cm$^2$ as it exits valve 281.

During normal operation, when the main gas supply source 25 supplies gas at 6.8 Kg/cm$^2$ to conduit 28, gas from the back-up supply source 26 is stopped at pressure regulating valve 281 since the back-up gas pressure of 5.8 Kg/cm$^2$ cannot flow against the higher gas pressure of 6.8 Kg/cm$^2$, i.e., gas from the main supply source 25. However, when the main gas supply source 25, i.e., the trailer gas supply, is gradually consumed such that the gas pressure drops below 5.8 Kg/cm$^2$, the gas flow of 5.8 Kg/cm$^2$ from the back-up gas supply source 26 flows through pressure regulating valve 281 into conduit 28, and then through conduits 23 and 231 for supplying to the process tool 27. This prevents any possible gas supply interruption at the process tool 27 and fulfills the function of an uninterrupted supply of gas by the present invention novel apparatus. Another benefit made possible by the present invention novel apparatus is that, by using the two stage pressure regulating process, a more stable gas pressure can be achieved and maintained, thus avoiding pressure fluctuation normally seen in a conventional gas supply system. The stable gas supply pressure provides improved process control of any process carried out in the process tool 27 resulting in improved reliability.

When the back-up, or the auxiliary gas supply source 26 becomes the main gas supply to the process tool 27, the present invention novel method can be further carried out by regulating the gas pressure from the back-up gas supply source 26 from 150 Kg/cm$^2$ to 15 Kg/cm$^2$ at the pressure regulating valve 223. The gas pressure of 15 Kg/cm$^2$ in conduit 22 is then further reduced to 6.8 Kg/cm$^2$ at the pressure regulating valve 224 and fed into conduit 222 for entering into the three-way flow control valve 24 through valve 242. The three-way flow control valve is set such that valve 242 is connected to valve 243 (while valve 241 is closed) such that the gas pressure of 6.8 Kg/cm$^2$ from the back-up gas supply source 26 flows through conduit 232, 23 and 231 into the process tool 27 for carrying out a fabrication process.

The present invention novel apparatus further functions when a system operator fails to change the back-up gas supply 26 when the pressure in cylinders 26 gradually drops due to consumption of the gas contained therein. When the gas pressure in cylinders 26 drops to about 5.8 Kg/cm$^2$, the gas supply is again switched to the trailer gas supply 25 which has been replaced with fresh tubes containing gas at a pressure of 150 Kg/cm$^2$. The gas in the trailer gas supply 25 is fed into conduit 211 and its pressure reduced to 15 Kg/cm$^2$ by pressure regulating valve 213. Conduit 29 then flows the gas at 15 Kg/cm$^2$ through pressure regulating valve 291 into conduit 231 at a pressure of 5.8 Kg/cm$^2$. The gas is then fed into the process tool 27 through conduit 231 to prevent any possible interruption of the gas supply. The novel features and advantages provided by the present invention apparatus and method have therefore been amply described above and in FIG. 2.

Figure 3:
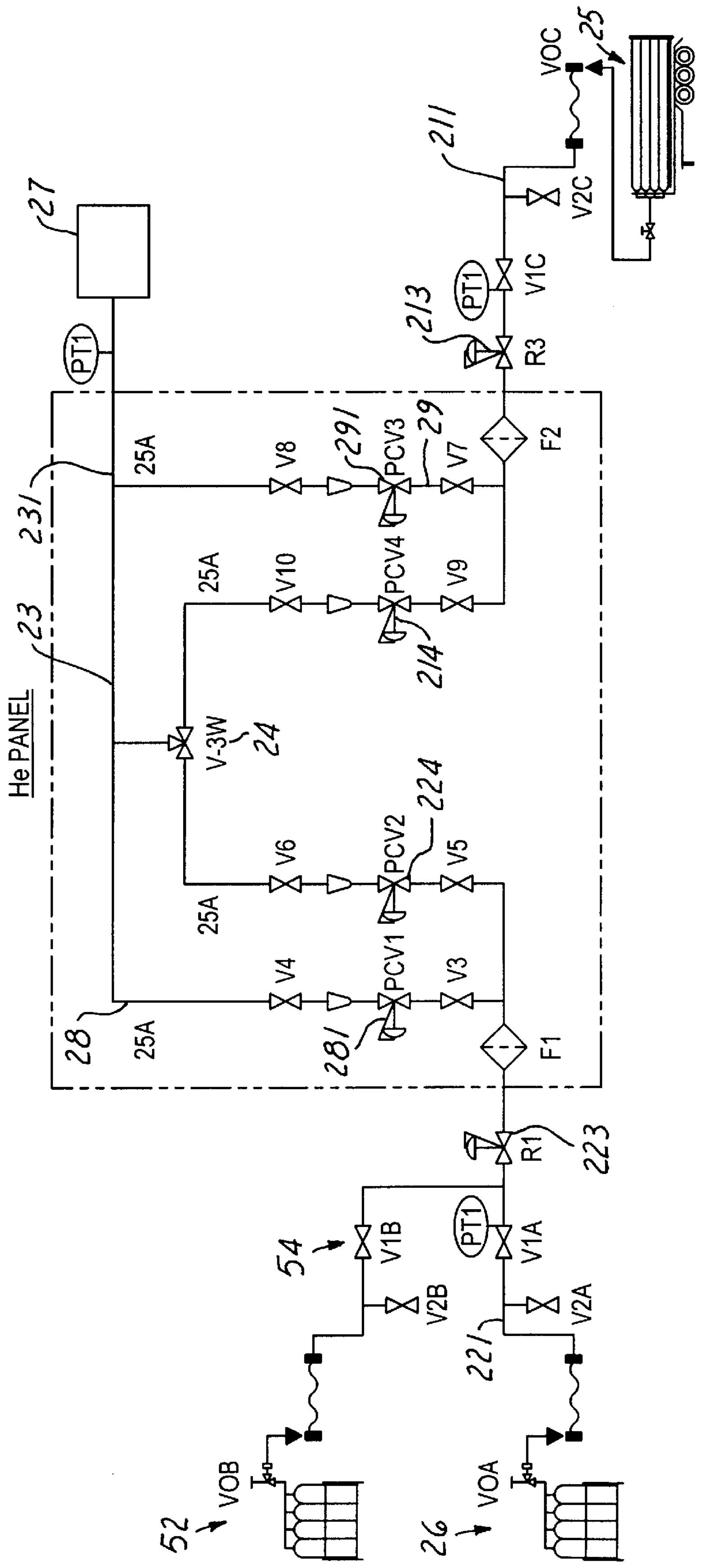
FIG. 3 is a schematic illustrating an alternate embodiment of the present invention automatic switching gas supply system that utilizes two auxiliary gas supply sources.

In an alternate embodiment , shown in FIG. 3, a present invention automatic switching gas supply system 50 is shown with two separate back-up gas supply sources 26 and 52. The gas from the back-up gas supply source 52 can be fed through a shut-off valve 54 which is normally kept open to flow into the pressure regulating valve 223. The operation of the automatic switching gas supply system 50 is similar to that shown for system 40 in FIG. 2 except that, the second back-up gas supply source 52 is connected in parallel with the first back-up gas supply source 26. This enables the back-up gas supply source to be used for a longer period of time before the cylinders need to be changed, which allows ample time for replacing the trailer gas source 25.

Figure 4:
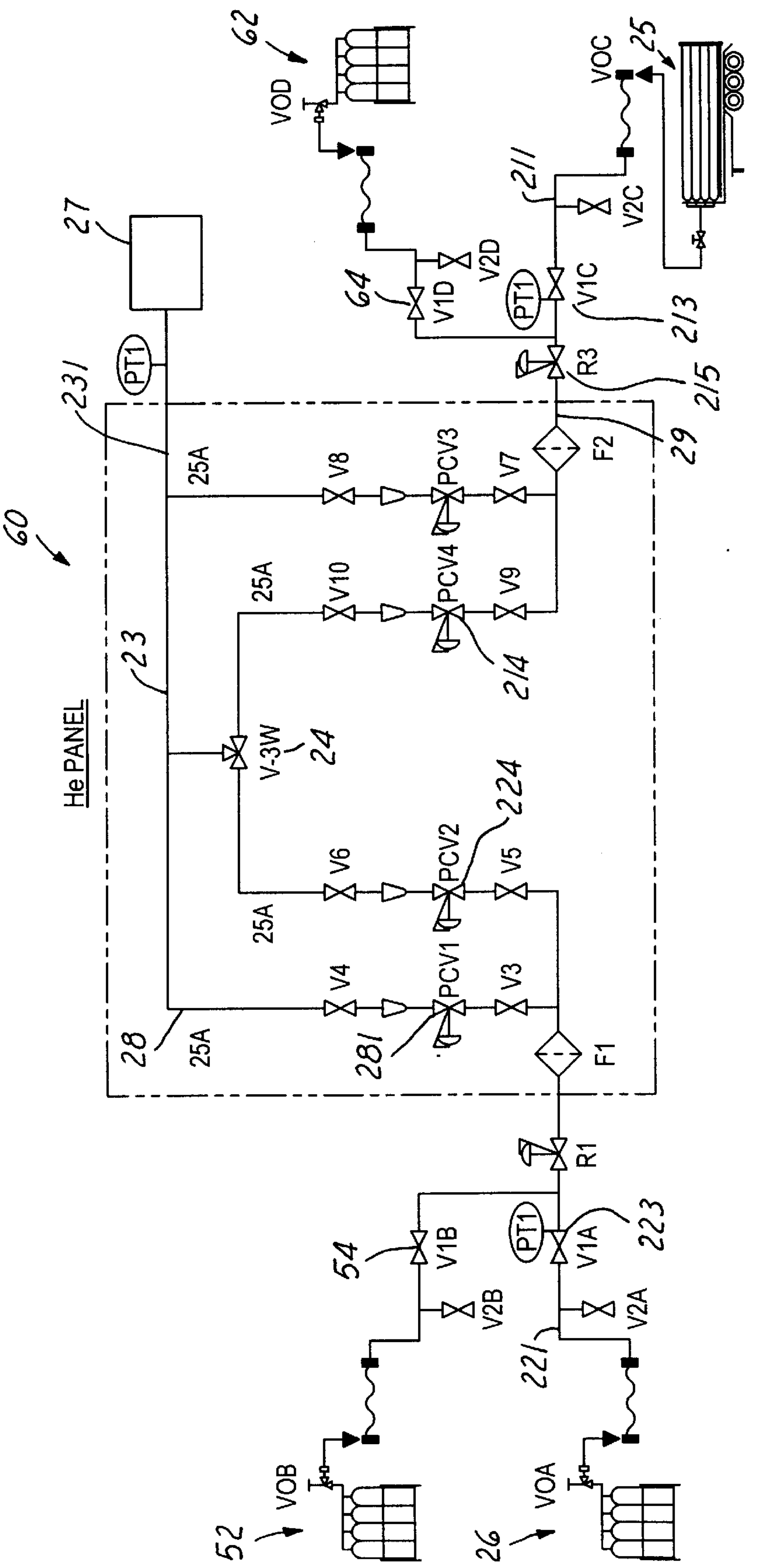
FIG. 4 is an illustration showing another alternate embodiment of the present invention automatic switching gas supply system wherein three auxiliary gas supply sources are utilized with the third system manually shut-off.

In another alternate embodiment, a present invention automatic switching gas supply system 60 is shown in FIG. 4. The automatic switching gas supply system 60, other than the main gas source 25, the back-up gas supply sources 26, 52, further includes a third back-up gas supply source 62. It should be noted that the gas from the third back-up gas supply source 62 is connected to conduit 29 through an additional pressure regulating valve 215. During normal operations, unless the shut-off valve 64 is closed, gas flows from the third back-up supply source 62 into conduit 29 merging with the gas flow from the main gas supply source 25. As a result, the gas pressure in the third back-up gas supply source 62 decreases simultaneously with the gas pressure in the main gas source 25. It is therefore desirable to close the shut-off valve 64 during the normal operation of the main gas supply source 25. The shut-off valve 64 is opened only when the other two back-up gas supply sources 26, 52 are being utilized.

The present invention novel apparatus and method have therefore been amply described in the above descriptions and in the appended drawings of FIGS. 2, 3 and 4.

While the present invention has been described in an illustrative manner, it should be understood that the terminology used is intended to be in a nature of words of description rather than of limitation.

Furthermore, while the present invention has been described in terms of a preferred and alternate embodiments, it is to be appreciated that those skilled in the art will readily apply these teachings to other possible variations of the inventions.

The embodiment of the invention in which an exclusive property or privilege is claimed are defined as follows:

1. An automatic switching gas supply system comprising:

a main gas supply source, at least one auxiliary gas supply source, a main gas supply conduit connecting in fluid communication at a first end with said main gas supply source and at a second end with a process machine, said main gas supply conduit further comprises a first pressure regulator connected in line for allowing a gas having a first pressure to pass said main gas supply conduit further comprises a first main gas supply conduit connecting said main gas supply source to said process machine through a three-way flow control valve, and a second main gas supply conduit connecting said main gas supply source to said process machine through a pressure regulating valve, and at least one auxiliary gas supply conduit in fluid communication at a first end with said at least one auxiliary gas supply source and at a second end with said process machine and said main gas supply conduit in a parallel manner, said at least one auxiliary gas supply conduit comprises at least one second pressure regulator connected in line for allowing a gas having a second pressure to pass, said second pressure having a pressure differential of at least 0.5 $Kg/cm^2$ smaller than said first pressure such that only when said first pressure decreases by at least said pressure differential, said gas supply system switches automatically to said at least one auxiliary gas supply source so that gas being supplied through said at least one auxiliary gas supply conduit into said process machine.

2. An automatic switching gas supply system according to claim 1, wherein said second pressure having a pressure differential of at least 1 $Kg/cm^2$ smaller than said first pressure.

3. An automatic switching gas supply system according to claim 1, wherein said system operates in a mechanical manner without the need for electricity.

4. An automatic switching gas supply system according to claim 1 further comprising a three-way control valve connected to said process machine, said main gas supply conduit and said at least one auxiliary gas supply conduit.

5. An automatic switching gas supply system according to claim 1, wherein said at least one auxiliary gas supply conduit further comprises a first auxiliary gas supply conduit connecting said auxiliary gas supply source to said process machine through a three-way flow control valve, and a second auxiliary gas supply conduit connecting said auxiliary gas supply source to said process machine through a pressure regulating valve.

6. An automatic switching gas supply system according to claim 1, wherein said gas flown through said gas supply system is an inert gas.

7. An automatic switching gas supply system according to claim 1, wherein said gas flown through said gas supply system is helium.

8. An automatic switching gas supply system according to claim 1, wherein said main gas supply source is a trailer mounted gas supply.

9. An automatic switching gas supply system according to claim 1, wherein said man gas supply source comprises a trailer mounted gas supply stored at a pressure between about 40 $Kg/cm^2$ and about 160 $Kg/cm^2$.

10. An automatic switching gas supply system according to claim 1, wherein said at least one auxiliary gas supply source comprises at least one back-up gas cylinder.

11. An automatic switching gas supply system according to claim 1, wherein said first pressure of said gas is about 6.8 $Kg/cm^2$ and said second pressure of said gas is about 5.8 $Kg/cm^2$.

12. An automatic switching gas supply system according to claim 1, wherein said pressure differential is about 1 $Kg/cm^2$.

13. A method for automatic switching to a back-up gas supply in a gas supply system comprising the steps of:

providing a main gas supply source and at least one back-up gas supply source, connecting a first conduit to said main gas supply source at a first end and to a process machine at a second end with a first pressure regulator thereinbetween for allowing a gas to flow through at a first pressure, connecting at least one second conduit to said at least one back-up gas supply source at a first end and to said process machine and said first conduit simultaneously in parallel at a second end with a second pressure regulator connected between said first and said second end for allowing a gas to flow through at a second pressure connecting a three-way flow control valve to said process machine, said first conduit and said at least one second conduit, flowing said gas through said first conduit from said main gas supply source into said process machine when said first pressure having a pressure differential of at least 0.5 $Kg/cm^2$ larger than said second pressure, and flowing said gas through said at least one second conduit from said at least one back-up gas supply source into said process machine when said first pressure decreases by at least an amount equal to said pressure differential.

14. A method for automatic switching to a back-up gas supply in a gas supply system according to claim 13 further comprising the step of flowing said gas through said first conduit from said main gas supply source into said process machine when said first pressure having preferably a pressure differential of at least 1 $Kg/cm^2$ larger than said second pressure.

15. A method for automatic switching to a back-up gas supply in a gas supply system according to claim 14 further comprising the step of providing said main gas supply source in a trailer mounted gas supply.

16. A method for automatic switching to a back-up gas supply in a gas supply system according to claim 13 further comprising the step of providing said at least one back-up gas supply in at least one back-up cylinder.

17. A method for automatic switching to a back-up gas supply in a gas supply system according to claim 14 further comprising the step of flowing said gas at a first pressure of 6.8 $Kg/cm^2$ and at a second pressure of 5.8 $Kg/cm^2$.

18. A method for automatic switching to a back-up gas supply in a gas supply system according to claim 13 further comprising the step of flowing through said gas supply system with a gas of helium.

* * * * *